US012782936B2

(12) United States Patent
Nemec et al.

(10) Patent No.: US 12,782,936 B2
(45) Date of Patent: Nov. 3, 2026

(54) AUTONOMOUS VEHICLES

(71) Applicant: Waymo LLC, Mountain View, CA (US)

(72) Inventors: Philip Nemec, San Jose, CA (US); Anne Kristiina Aula, Mountain View, CA (US); David Tse-Zhou Lu, Menlo Park, CA (US); Brian Douglas Cullinane, Palo Alto, CA (US); Calvin Karl Johnson, San Francisco, CA (US); Albert Shane, Berkeley, CA (US); Christopher Kennedy Ludwick, Los Altos, CA (US); YooJung Ahn, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 80 days.

(21) Appl. No.: 18/374,257

(22) Filed: Sep. 28, 2023

(65) Prior Publication Data

US 2024/0045424 A1 Feb. 8, 2024

Related U.S. Application Data

(63) Continuation of application No. 17/009,825, filed on Sep. 2, 2020, now Pat. No. 11,803,183, which is a (Continued)

(51) Int. Cl.
*G05D 1/00* (2024.01)
*B60K 28/02* (2006.01)

(Continued)

(52) U.S. Cl.
CPC ........... *G05D 1/0055* (2013.01); *B60K 28/02* (2013.01); *B60K 35/10* (2024.01); *B60K 35/28* (2024.01);

(Continued)

(58) Field of Classification Search
CPC .. G05D 1/0055; G05D 1/0016; G05D 1/0088; G05D 1/02; G05D 1/021;

(Continued)

(56) References Cited

U.S. PATENT DOCUMENTS 4,361,202 A 11/1982 Minovitch
4,465,155 A 8/1984 Collins (Continued)

FOREIGN PATENT DOCUMENTS

CN 1470012 A 1/2004
CN 101421741 A 4/2009

(Continued)

OTHER PUBLICATIONS

Machine Translated JP-2011057134-A (Year: 2011).*

(Continued)

*Primary Examiner* — Anne Marie Antonucci
*Assistant Examiner* — Misa H Nguyen
(74) *Attorney, Agent, or Firm* — Botos Churchill IP Law

(57) ABSTRACT

Aspects of the present disclosure relate to a vehicle for maneuvering a passenger to a destination autonomously. The vehicle includes one or more computing devices and a set of user input buttons for communicating requests to stop the vehicle and to initiate a trip to the destination with the one or more computing devices. The set of user input buttons consisting essentially of a dual-purpose button and an emergency stopping button different from the dual-purpose button configured to stop the vehicle. The dual-purpose button has a first purpose for communicating a request to initiate the trip to the destination and a second purpose for communicating a request to pull the vehicle over and stop the vehicle. The vehicle has no steering wheel and no user inputs for the steering, acceleration, and deceleration of the vehicle other than the set of user input buttons.

18 Claims, 12 Drawing Sheets

100

Related U.S. Application Data continuation of application No. 15/962,047, filed on Apr. 25, 2018, now Pat. No. 10,795,355, which is a continuation of application No. 15/176,535, filed on Jun. 8, 2016, now Pat. No. 9,983,582, which is a continuation of application No. 14/455,215, filed on Aug. 8, 2014, now Pat. No. 9,436,182.

(60) Provisional application No. 62/002,319, filed on May 23, 2014.

(51) Int. Cl.

| | |
|---|---|
| ***B60K 35/10*** | (2024.01) |
| ***B60K 35/28*** | (2024.01) |
| ***B60K 35/65*** | (2024.01) |
| ***B60W 30/06*** | (2006.01) |
| ***B60W 50/08*** | (2020.01) |
| ***B60W 60/00*** | (2020.01) |
| ***B62D 15/02*** | (2006.01) |
| ***G08B 25/01*** | (2006.01) |

(52) U.S. Cl.

CPC ........... *B60K 35/656* (2024.01); *B60W 30/06* (2013.01); *B60W 50/082* (2013.01); *B60W 60/00253* (2020.02); *B60W 60/007* (2020.02); *B62D 15/0285* (2013.01); *G05D 1/0016* (2013.01); *G05D 1/0088* (2013.01); *G05D 1/02* (2013.01); *G05D 1/021* (2013.01); *G05D 1/0212* (2013.01); *B60K 2360/122* (2024.01); *B60K 2360/128* (2024.01); *B60K 2360/143* (2024.01); *B60K 2360/175* (2024.01); *B60K 2360/682* (2024.01); *B60W 2540/215* (2020.02); *B60Y 2302/05* (2013.01); *G08B 25/016* (2013.01)

(58) Field of Classification Search

CPC ...... G05D 1/0212; B60K 28/02; B60K 35/00; B60K 35/10; B60K 35/28; B60K 2360/122; B60K 2360/128; B60K 2360/143; B60K 2360/175; B60K 2360/682; B60K 35/656; B60W 30/06; B60W 50/082; B60W 60/00253; B60W 60/007; B60W 2540/215; B60W 50/085; B62D 15/0285; B60Y 2302/05; G08B 25/016

See application file for complete search history.

(56) References Cited

U.S. PATENT DOCUMENTS 5,293,160 A 3/1994 Kurozu et al.
5,367,456 A 11/1994 Summerville et al.
5,448,479 A 9/1995 Kemner et al.
5,640,323 A 6/1997 Kleimenhagen et al.
5,774,069 A * 6/1998 Tanaka ...................... B60T 7/12 340/436
6,184,802 B1 2/2001 Lamb
6,236,333 B1 5/2001 King
6,298,304 B1 10/2001 Theimer
6,356,820 B1 3/2002 Hashimoto et al.
6,591,172 B2 7/2003 Oda et al.
6,670,883 B1 12/2003 Asakura et al.
6,680,675 B1 1/2004 Suzuki
6,697,730 B2 2/2004 Dickerson
6,963,794 B2 11/2005 Geber et al.
7,113,864 B2 9/2006 Smith et al.
7,126,583 B1 10/2006 Breed
7,859,386 B2 12/2010 Lundkvist
7,928,829 B2 4/2011 Hermann
8,044,771 B2 10/2011 Nakajima et al.
8,078,349 B1 12/2011 Prada Gomez et al.
8,126,450 B2 2/2012 Howarter et al.
8,352,112 B2 1/2013 Mudalige
8,494,765 B2 7/2013 Konet et al.
8,532,862 B2 9/2013 Neff
8,676,427 B1 3/2014 Ferguson et al.
8,676,430 B1 3/2014 Ferguson et al.
8,688,306 B1 4/2014 Nemec et al.
8,718,861 B1 5/2014 Montemerlo et al.
8,736,438 B1 5/2014 Vasquez et al.
8,768,565 B2 7/2014 Jefferies et al.
8,812,186 B2 8/2014 Oh et al.
8,816,878 B2 8/2014 Kadowaki et al.
8,880,270 B1 11/2014 Ferguson et al.
8,935,034 B1 1/2015 Zhu et al.
9,060,003 B2 6/2015 Wang et al.
9,116,015 B2 8/2015 Ishikawa et al.
9,156,476 B2 10/2015 O'Neill et al.
9,191,514 B1 11/2015 Cavanaugh et al.
9,194,168 B1 11/2015 Lu et al.
9,304,513 B2 4/2016 Ichikawa et al.
9,517,766 B2 12/2016 Nakada et al.
9,523,984 B1 12/2016 Herbach et al.
10,055,694 B2 8/2018 Ichinose et al.
10,379,537 B1 8/2019 Arden et al.
10,477,159 B1 11/2019 Fredinburg et al.
10,795,355 B2 10/2020 Nemec et al.
2004/0036622 A1 2/2004 Dukach et al.
2004/0122570 A1 6/2004 Sonoyama et al.
2004/0249569 A1 12/2004 Oh
2004/0260470 A1 12/2004 Rast
2005/0021227 A1 1/2005 Matsumoto et al.
2005/0153707 A1 7/2005 Ledyard et al.
2005/0227704 A1 10/2005 Ferra et al.
2006/0253251 A1 11/2006 Puranik et al.
2007/0073472 A1 3/2007 Odinak et al.
2007/0073552 A1 3/2007 Hileman
2007/0219720 A1 9/2007 Trepagnier et al.
2008/0027590 A1 1/2008 Phillips et al.
2008/0061931 A1 3/2008 Hermann
2008/0136674 A1 6/2008 Jang et al.
2008/0195428 A1 8/2008 O'Sullivan
2008/0266139 A1 10/2008 Kim
2008/0312817 A1 12/2008 Kawauchi
2009/0037033 A1 2/2009 Phillips et al.
2009/0140994 A1 6/2009 Tanaka et al.
2009/0156241 A1 6/2009 Staffaroni et al.
2009/0171566 A1 7/2009 Morimoto et al.
2009/0187538 A1 7/2009 Grun
2009/0216600 A1 8/2009 Hill
2009/0248231 A1 10/2009 Kamiya
2009/0287367 A1 11/2009 Salinger
2010/0007525 A1 1/2010 Shanbhag et al.
2010/0017084 A1 1/2010 Riegel
2010/0070168 A1 3/2010 Sumcad et al.
2010/0075656 A1 3/2010 Howarter et al.
2010/0106397 A1 4/2010 Van
2010/0117585 A1 5/2010 Fitch et al.
2010/0183409 A1 7/2010 Checketts et al.
2010/0256836 A1 10/2010 Mudalige
2010/0284771 A1 11/2010 Stierler
2010/0286845 A1 11/2010 Rekow et al.
2011/0059693 A1 3/2011 O'Sullivan
2011/0099040 A1 4/2011 Felt et al.
2011/0112969 A1 5/2011 Zaid et al.
2011/0130954 A1 6/2011 D'Andrea et al.
2011/0144865 A1 6/2011 Niemz
2011/0144980 A1 6/2011 Rysenga
2011/0191019 A1 8/2011 Holsinger et al.
2011/0301985 A1 12/2011 Camp et al.
2011/0313804 A1 12/2011 Camp et al.
2012/0041675 A1 2/2012 Juliver et al.
2012/0072051 A1 3/2012 Koon
2012/0083959 A1 4/2012 Dolgov et al.
2012/0083960 A1 4/2012 Zhu et al.
2012/0083964 A1 4/2012 Montemerlo et al.
2012/0109721 A1 5/2012 Cebon et al.
2012/0173080 A1 7/2012 Cluff
2012/0188100 A1 7/2012 Min et al.

(56) References Cited

U.S. PATENT DOCUMENTS

| | | | | |
|---|---|---|---|---|
| 2012/0253607 | A1* | 10/2012 | Choi | B60R 25/25 340/5.82 |
| 2012/0271500 | A1 | 10/2012 | Tsimhoni et al. | |
| 2013/0024049 | A1 | 1/2013 | Yoshioka et al. | |
| 2013/0110342 | A1 | 5/2013 | Wuttke et al. | |
| 2013/0110343 | A1 | 5/2013 | Ichikawa et al. | |
| 2013/0218647 | A1 | 8/2013 | Kroll et al. | |
| 2013/0231824 | A1 | 9/2013 | Wilson et al. | |
| 2013/0238783 | A1 | 9/2013 | Alexander et al. | |
| 2013/0289825 | A1 | 10/2013 | Noh et al. | |
| 2013/0321178 | A1 | 12/2013 | Jameel et al. | |
| 2014/0052312 | A1 | 2/2014 | Stadler | |
| 2014/0135598 | A1 | 5/2014 | Weidl et al. | |
| 2014/0172292 | A1 | 6/2014 | Mcgee et al. | |
| 2014/0172727 | A1 | 6/2014 | Abhyanker et al. | |
| 2014/0189096 | A1 | 7/2014 | Miller et al. | |
| 2014/0285361 | A1 | 9/2014 | Tippelhofer et al. | |
| 2014/0350855 | A1 | 11/2014 | Vishnuvajhala | |
| 2014/0358353 | A1 | 12/2014 | Ibanez-Guzman et al. | |
| 2014/0365250 | A1 | 12/2014 | Ikeda et al. | |
| 2014/0380424 | A1 | 12/2014 | Thompson | |
| 2015/0073645 | A1 | 3/2015 | Davidsson et al. | |
| 2015/0081362 | A1 | 3/2015 | Chadwick et al. | |
| 2015/0127191 | A1 | 5/2015 | Misra et al. | |
| 2015/0148989 | A1 | 5/2015 | Cooper et al. | |
| 2015/0149320 | A1 | 5/2015 | Smirin | |
| 2015/0172894 | A1 | 6/2015 | Gabel | |
| 2015/0185034 | A1 | 7/2015 | Abhyanker | |
| 2015/0219464 | A1 | 8/2015 | Beaurepaire et al. | |
| 2015/0279210 | A1 | 10/2015 | Zafiroglu et al. | |
| 2015/0302540 | A1 | 10/2015 | Ranney | |
| 2015/0321641 | A1 | 11/2015 | Abou Mahmoud et al. | |
| 2015/0324708 | A1 | 11/2015 | Skipp et al. | |
| 2015/0334187 | A1 | 11/2015 | Pesola et al. | |
| 2015/0338849 | A1 | 11/2015 | Nemec et al. | |
| 2015/0339928 | A1 | 11/2015 | Ramanujam | |
| 2015/0369621 | A1 | 12/2015 | Abhyanker | |
| 2015/0370251 | A1 | 12/2015 | Siegel et al. | |
| 2016/0019790 | A1 | 1/2016 | Tobolski et al. | |
| 2016/0027307 | A1 | 1/2016 | Abhyanker et al. | |
| 2016/0042303 | A1 | 2/2016 | Medina et al. | |
| 2016/0116293 | A1 | 4/2016 | Grover et al. | |
| 2016/0125735 | A1 | 5/2016 | Tuukkanen | |
| 2016/0148514 | A1 | 5/2016 | Iwami et al. | |
| 2016/0170410 | A1 | 6/2016 | Ichikawa et al. | |
| 2016/0203377 | A1 | 7/2016 | Irie et al. | |
| 2016/0221495 | A1 | 8/2016 | Cunningham, III et al. | |
| 2016/0301698 | A1 | 10/2016 | Katara et al. | |
| 2016/0318518 | A1 | 11/2016 | Suzuki et al. | |
| 2016/0327949 | A1 | 11/2016 | Wilson et al. | |
| 2016/0349751 | A1 | 12/2016 | Sugimoto | |
| 2017/0075358 | A1 | 3/2017 | Zhang | |
| 2017/0123423 | A1 | 5/2017 | Sako et al. | |
| 2018/0017969 | A1 | 1/2018 | Nagy et al. | |

FOREIGN PATENT DOCUMENTS

| | | | | | |
|---|---|---|---|---|---|
| CN | 101971116 | A | | 2/2011 | |
| CN | 102460535 | A | | 5/2012 | |
| CN | 1024602535 | A | | 5/2012 | |
| CN | 102939230 | A | | 2/2013 | |
| CN | 103339010 | A | | 10/2013 | |
| CN | 103587504 | A | | 2/2014 | |
| DE | 102005049380 | A1 | | 4/2007 | |
| DE | 102009033752 | A1 | | 1/2011 | |
| EP | 2573720 | A1 | | 3/2013 | |
| EP | 2629269 | A1 | | 8/2013 | |
| JP | S60202621 | A | | 10/1985 | |
| JP | H07277160 | A | | 10/1995 | |
| JP | H08161046 | A | | 6/1996 | |
| JP | H08244494 | A | | 9/1996 | |
| JP | H11-208497 | A | | 8/1999 | |
| JP | 2001-234653 | A | | 8/2001 | |
| JP | 2002178795 | A | | 6/2002 | |
| JP | 2003195941 | A | | 7/2003 | |
| JP | 2003205807 | A | | 7/2003 | |
| JP | 2003256046 | A | | 9/2003 | |
| JP | 2004171041 | A | | 6/2004 | |
| JP | 2004227262 | A | | 8/2004 | |
| JP | 2006040683 | A | | 2/2006 | |
| JP | 3759979 | B2 | | 3/2006 | |
| JP | 2007268086 | A | | 10/2007 | |
| JP | 2009122373 | A | * | 6/2009 | |
| JP | 2010222898 | A | * | 10/2010 | |
| JP | 2011057134 | A | * | 3/2011 | |
| JP | 2011226441 | A | | 11/2011 | |
| JP | 2013238182 | A | | 11/2013 | |
| JP | 2014019301 | A | | 2/2014 | |
| KR | 20080074577 | A | * | 8/2008 | G08G 1/0969 |
| WO | 03080391 | A2 | | 10/2003 | |
| WO | 2011158347 | A1 | | 12/2011 | |
| WO | 20110158347 | A1 | | 12/2011 | |
| WO | WO-2011154681 | A1 | * | 12/2011 | H01H 23/16 |
| WO | 2013117205 | A1 | | 8/2013 | |
| WO | 2015169204 | A1 | | 11/2015 | |

OTHER PUBLICATIONS

Machine Translated JP-2009122373-A (Year: 2009).*

Machine Translated JP-2010222898-A (Year: 2010).*

Machine Translated WO-2011154681-A1 (Year: 2011).*

Machine Translated KR-20080074577-A (Year: 2008).*

C. Tunasar, G. Bender and H. Young, "Modeling curbside vehicular traffic at airports," 1998 Winter Simulation Conference. Proceedings (Cat. No. 980H36274), Washington, DC, USA, 1998, pp. 1113-1117vol. 2, doi: 10.1109/WSC.1998.745967. (Year:1998).

J. Cawkwell, "A visually guided AGV for use as passenger transport in urban areas," ITSC2000. 2000 IEEE Intelligent Transportation Systems. Proceedings (Cat. No.00TH8493), Dearborn, MI, USA, 2000, pp. 311-315, doi: 10.1109/ITSC.2000.881076. (Year: 2000).

N. J. Yuan, Y. Zheng, L. Zhang and X. Xie, "T-Finder: A Recommender System for Finding Passengers and Vacant Taxis," in IEEE Transactions on Knowledge and Data Engineering, vol. 25, No. 10, pp. 2390-2403, Oct. 2013, doi:10.1109/TKDE.2012.153. (Year: 2013).

"A Study on Layout Design and Evaluation Methods of Passenger Drop Off Lanes on Elevated Roads in Large w Railway Stations", Y. Zhu, et al., 2008 International Conference on Intelligent Computation Technology and Automation (ICICTA), Changsha,China, 2008, pp. 316-320, doi: 10.1109/ICICTA.200 (Year: 2008).

"An Analysis of Tour Bus Operations within the National Mall and Memorial Parks", Margaret J. Daniels, Laurlyn K. Harmon, Rodney Vese, Minkyung Park, Russell E. Brayley, Feb. 2014), https://www.nps.gov/nationalmallplan/Documents/Trans/NAMA_PhaseV Final Report_ Oct312014. pdf (Year: 2014).

"Evaluation of taxi services on airport terminal's curbside for picking up passengers", L. Sanchez Passos, R. J. F. Rossetti and L. P. Reis, 6th Iberian Conference on Information Systems and Technologies (CISTI 2011), Chaves, Portugal, 2011, pp. 1-6. (Year: 2011).

Australia Notice of Acceptance for Application No. 2018203456 dated Feb. 18, 2020.

Australian Examination Report No. 2 for Australian Application No. 2018203456, mailed Sep. 26, 2019.

Decision to Grant from the Japan Patent Office for Application No. JP2018-200550 dated Mar. 6, 2020.

European Patent Office Action for Application No. 19193841.4 dated Jan. 27, 2021.

Extended European Search Report for European Application No. 19193841, mailed on Dec. 13, 2019.

Japanese Office Action for Application No. 2018200550 dated Nov. 29, 2019.

The First Office Action for Chinese Patent Application No. 201911239662.3, Nov. 11, 2022.

"Australian Examination Report No. 1 for Application No. 2018203456 dated Apr. 30, 2019", 5 pages.

(56) References Cited

OTHER PUBLICATIONS

“Decision of Rejection for Japanese Patent Application No. 2016-563820, dated Jul. 2, 2018”, 8 pages (5 pages of English Translation and 3 pages of official copy).
“Examination Report No. 1 for Australian Patent Application No. 2015263981 dated Aug. 25, 2017”, 7 pages.
“Examination Report No. 2 for Australian Patent Application No. 2015263981 dated Nov. 8, 2017”, 8 pages.
“Examination Report No. 3 for Australian Patent Application No. 2015263981 dated Jan. 29, 2018”, 9 pages.
“Examiner’s Report for Canadian Patent Application No. 2,947,995 dated Sep. 14, 2017”, 4 pages.
“Examiner’s Report for Canadian Patent Application No. 2,947,995, dated Jun. 4, 2018”, 4 pages.
“Extended European Search Report received for European Patent Application No. 15796123.6, mailed on Mar. 8, 2018”, 6 pages.
“Extended European Search Report received for European Patent Application No. 18156156.4, mailed on Mar. 28, 2018”, 6 pages.
“Federal Transit Administration, Topic Guides on ADA Transportation—Topic Guide 6, On-Time Performance”, <http://dredf.org/ADAlg/OTP.shtml>, Jul. 2011, 50 pages.
“Federal Transit Administration, Topic Guides on ADA Transportation—Topic Guide 7, No-Shows”, <http://dredf.org/ADAtg/noshow.shtml>, Jul. 2011, 27 pages.
“First Office Action received for Chinese Patent Application No. 201580023657.2, dated Jul. 27, 2018”, 21 pages (13 pages of English Translation and 8 pages of Official copy).
“International Preliminary Report on Patentability for International Application No. PCT/US2016/035977 dated Jan. 4, 2018”, 10 pages.
“International Preliminary Report on Patentability for PCT Application No. PCT/US2015/032171, dated Dec. 8, 2016”, 12 pages.
“International Search Report and Written Opinion for PCT Application No. PCT/US2016/035977 dated Sep. 29, 2016”, 12 pages.
“International Search Report and Written Opinion received for PCT Patent Application No. PCT/US2015/032171, dated Sep. 17, 2015”, 13 pages.
“International Search Report and Written Opinion received for PCT Patent Application No. PCT/US2015/032181, mailed on Sep. 4, 2015”, 12 pages.
“Japanese Office Action for Application No. 2018200550 dated Aug. 26, 2019”, 13 pages (7 pages of English Translation and 6 pages of Official copy).
“Japanese Office Action for Application No. JP2016-563820 dated Sep. 18, 2019”, 20 pages (11 pages of English Translation and 9 pages of Official copy).).
“Korean Office Action for Application No. 10-2019-7023148 dated Nov. 20, 2019”, 11 pages (5 pages of English Translation and 6 pages of Official copy).
“North Las Vegas—Code of Ordinance”, Available Online at <https:lllibrary.municode.com/nv/north_las_vegas/codes/code_of_ordinances/196159?nodeld= TIT1 OVETR_ CH1 0.48STSTPAGE_1 0.48.180STPACULOZO>, May 21, 2013, 13 pages.
“Notice of Acceptance received for Australian Patent Application No. 2015263981, dated Apr. 30, 2018”, 3 pages.
“Notice of Allowance in CN Application No. 201580023657.2, dated Sep. 27, 2019”, 4 pages (2 pages of English Translation and 2 pages of Official copy).
“Notice of Preliminary Rejection for Korean Patent Application No. 10-2016-7030982, dated Apr. 30, 2018”, 13 pages (6 pages of English Translation and 7 pages of Official copy).
“Notice of Reasons for Rejection received for Japanese Patent Application No. 2016-563820, dated Feb. 16, 2018”, 11 pages ( 6 pages of English Translation and 5 pages of Official copy).
“Office Action for JP Application No. 2018-200550, mailed Nov. 29, 2019”.
Baydere , et al., “MR 302: The Future of the Automobile: Car-Sharing Service using Autonomous Automobiles”, Spring 2014, 2014, pp. 1-10.
Bluetooth® Keyless, “FAQs about the Bluetooth® Passive Keyless Entry Module”, downloaded from <http://bluetoothkeyless.info/bluetooth-keyless-information/>, 2014, 3 pages.
Chevrolet , “OnStar Remote Link™: Control you Chevy even when you’re not driving it”, Available online at : <http://www.chevrolet.com/onstar-remotelink.html>, 2014, 2 pages.
Chung, You Chung, et al., “Wireless Safety Personnel Radio Device for Collision Avoidance System of Autonomous Vehicles”, 2002, IEEE Antennas and Propagation Society International Symposium, pp. 121-124.
Cui, Qiang , et al., “Design and Realization of Autopilot ATS Based on PXIe”, AVIC Aeronautical Computing Technique Research Institute, 2013, pp. 32-38.
Fagnant , et al., “The travel and environmental implications of shared autonomous vehicles, using agent-based model scenarios”, Transportation Research Part C, vol. 40, 2014, pp. 1-13 (The attached Reference includes 22 pages).
Goodwin, Antuan , “Add-on module auto-unlocks your car when your phone is near”, clnet, Available online at : <http://www.cnet.com/news/add-on-module-auto-unlocks-your-car-when-your-phone-is-near/>, Nov. 19, 2013, 5 pages.
Jaffe, Eric , “The First Look at How Google’s Self-Driving Car Handles City Streets—Citylab”, Available at <https:jjwww.citylab.com/life/2014/04/first-lookhow-googles-self-driving-car -handles-city-streets/8977/>, Apr. 28, 2014, 1-18 pages.
Junqing Wei , et al., “Towards a viable autonomous driving research platform”, In: Intelligent Vehicles Symposium (IV), 2013 IEEE, Jun. 23-26, 2013, pp. 763-770.
Mcfadden, Colin-Druce , “Autonomous car concept swaps steering wheel for gesture controls”, Available online at : <http://www.dvice.com/2014-3-12/autonomous-car-concept-swaps-steering-wheel-gesture-controls>, Mar. 12, 2014, 4 pages.
Mckeegan, Noel , “Autonomous taxi can be hailed with and iPad app”, Available online at : <http://www.gizmag.com/autonomous-taxi-ipad/16649/>, Oct. 14, 2010, 2 pages.
Quora , et al., “In Between Rides, Is it in an Uber (Company) Drive’s Best Interest to Stay Put or Drive Around?”, Quora.com—A Place to share knowledge and better understand the world. Available online at < https://www.quora.com/Inbetween-rides-is-it-in-an-Uber-company-drivers-best -interest-to-stay-put-or -drive-around>, Feb. 25, 2014, 2 pages.
Ranoa, Raoul , “Infographic: The car that drives itself”, Los Angeles Times, copyright 2014, Available online at <https://www.latimes.com/local/lanow/la-sci-g-google-self-driving-car-20140528-htmlstory.html>, 2014, 5 pages.
Ridden, Paul , “ATNMBL—the concept car with no steering wheel, brake pedal or driver’s seat”, Available online at : <http://www.gizmag.com/atnmbl-autonomous-concept-passenger-transport/15877/>, Jul. 29, 2010, 3 pages.
Schwarz , et al., “Towards Autonomous Vehicles”, University of Nebraska-Lincoln. Final Reports & Technical Breifs from Mid-America Transportation center. Reort# MATC-UI:117, Available Online at <http://digitalcommons.unl.edu/cgi/viewcontent.cgi?article=1 092&context=matcreports>, Dec. 2013, 79 pages.
UberPeople.NET , “How Long Do You Wait? Post Your Times”, UberPeople.NET—Independent Community of Rideshare Drivers, Available Online at <https://uberpeople.netlthreads/how-long-do-you-wait-post-your-times.2162/>, Aug. 20, 2014, 5 pages.
UberPeople.NET , “Wait Time for Riders”, UberPeople.NET—Independent Community of Rideshare Drivers. Available Online at < https://uberpeople.net/threads/wait-time-for-riders.2441 >, May 12, 2014, 7 pages.
Urmson , et al., “U.S. Appl. No. 61/391,271, filed Oct. 8, 2010, titled “Autonomous Vehicles””, 56 pages.

* cited by examiner

100

200

200

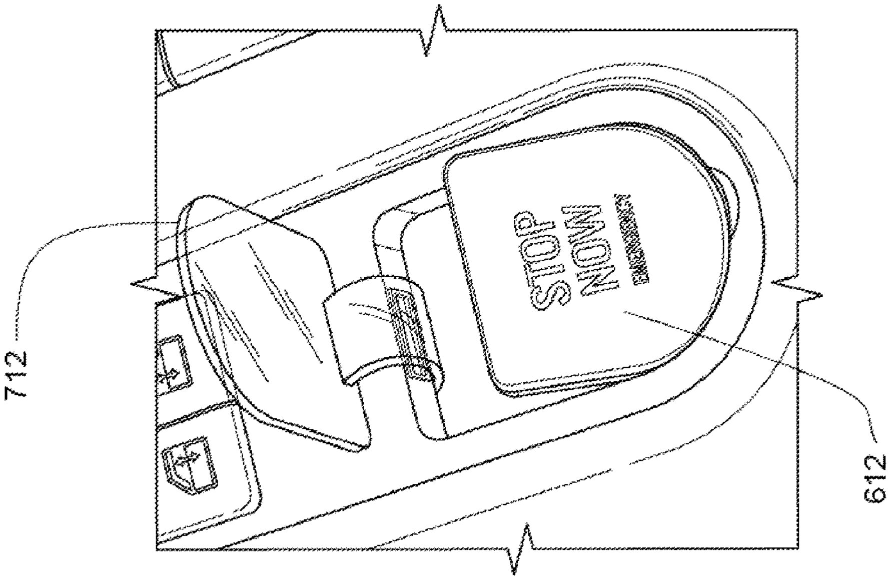
FIGURE 7C
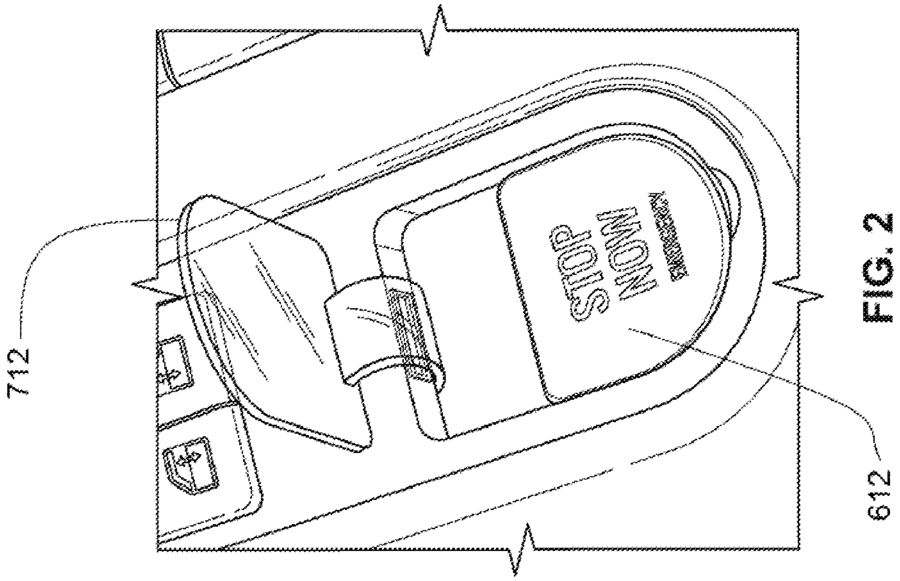
FIG. 2
FIGURE 7B
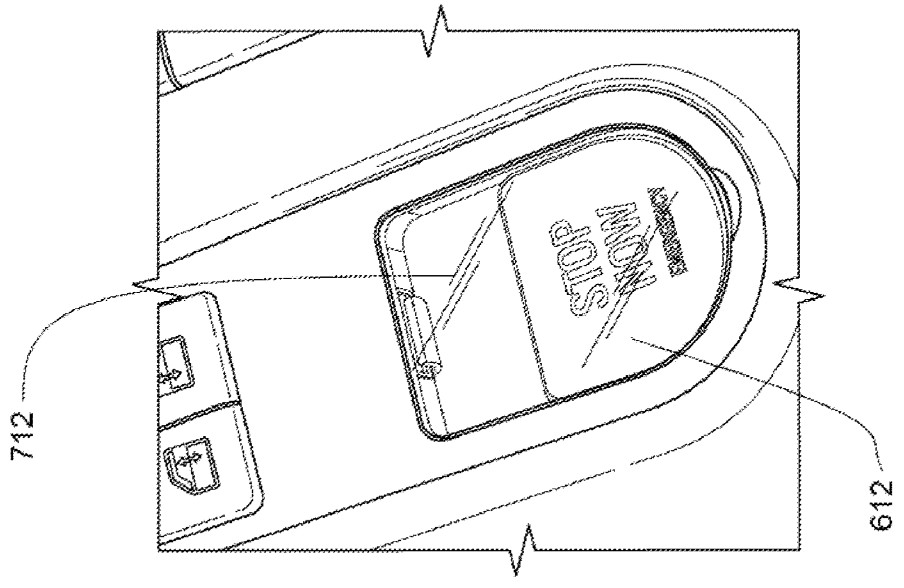
FIGURE 7A

614

900

AUTONOMOUS VEHICLES

CROSS REFERENCE TO RELATED APPLICATIONS

The present application is a continuation of U.S. patent application Ser. No. 17/009,825, filed Sep. 2, 2020, which is a continuation of U.S. patent application Ser. No. 15/962,047, filed Apr. 25, 2018, now issued as U.S. Pat. No. 10,795,355, which is a continuation of U.S. patent application Ser. No. 15/176,535, filed Jun. 8, 2016, now issued as U.S. Pat. No. 9,983,582, which is a continuation of U.S. patent application Ser. No. 14/455,215, filed Aug. 8, 2014, now issued as U.S. Pat. No. 9,436,182, which claims the benefit of the filing date of U.S. Provisional Patent Application No. 62/002,319 filed May 23, 2014, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a vehicle for maneuvering a passenger to a destination autonomously. The vehicle includes one or more computing devices and a set of user input buttons configured to communicate requests to stop the vehicle and to initiate a trip to the destination with the one or more computing devices. The set of user input buttons consists essentially of (1) a dual-purpose button having a first purpose to communicate a request to initiate the trip to the destination and a second purpose to communicate a request to pull the vehicle over and stop the vehicle, and (2) an emergency stopping button different from the dual-purpose button, the emergency stopping button configured to stop the vehicle.

In one example, the vehicle also includes one or more short range wireless network connections configured to communicate between the one or more computing devices and a client computing device. In another example, the vehicle also includes one or more wireless network connections configured to communicate between the one or more computing devices and a server computing device. The wireless network connections allow for the server computing device to relay information received from a client computing device to the one or more computing devices. In another example, the vehicle also includes a microphone configured to provide user input to the one or more computing devices. In another example, the second purpose is only available after the dual-purpose button has been activated according to the first purpose. In another example, the vehicle also includes a drive train does not include a steering wheel, a deceleration pedal, or an acceleration pedal. In another example, the vehicle also includes no user inputs for the steering, acceleration, and deceleration of the vehicle other than the set of user buttons. In another example, the dual-purpose button is configured to have an inactive state when the one or more computing devices are not ready to initiate the trip. In another example, the dual-purpose button is configured to have two active states. A first of the two active states includes display information identifying that the button is operable for the first purpose and not the second purpose, and a second of the two active states includes display information identifying that the button is operable for the second purpose and not the first purpose. In another example, the one or more computing devices are configured to keep the dual-purpose button in an inactive state when the vehicle is not ready to initiate the trip. In another example, the emergency stopping button includes a cover configured to be moved into a first position in order to allow a passenger to activate the emergency stopping button. In this example, the emergency stopping button is configured to be pulled up to activate the emergency stopping button when the cover is in the first position.

Another aspect of the disclosure provides a vehicle for maneuvering a passenger to a destination autonomously. The vehicle includes one or more computing devices and a set of user input buttons configured to communicate requests to stop the vehicle and to initiate a trip to the destination with the one or more computing devices. The set of user input buttons consists essentially of a first button configured to communicate a request to initiate the trip to the destination, a second button configured to communicate a request to stop the vehicle within a first period of time, and a third button different from the first button and the second button. The third button is configured to communicate a request to initiate an emergency stop within a second period of time less than the first period of time.

In this example, the first button is configured to have an active state for communicating the request to initiate the trip to the destination and an inactive state, and the second button is configured to have an active state communicating the request to stop the vehicle within the first period of time and an inactive state. The active state of the first button is available only when the second button is in the inactive state. In this example, the one or more computing devices are configured to keep the first button in the inactive state when the vehicle is not ready to initiate the trip. In addition to or alternatively, the one or more computing devices are configured to keep the second button in the inactive state until the trip has been initiated. In another example, when the second button is activated, the one or more computing devices are configured to initiate a countdown to allow a passenger to cancel the request to stop the vehicle, and, when the countdown is completed, identify a location to stop the vehicle within the first period of time. In another example, when the second button is activated, the one or more computing devices are configured to stop the vehicle within the first period of time and put the first button into the active state and the second button into the inactive state. In another example, when the third button is activated, the one or more computing devices are configured to stop the vehicle within the second period of time and when the vehicle is stopped, put both the first button and the second button into the inactive states.

A further aspect of the disclosure provides a vehicle for maneuvering a passenger to a destination autonomously. The vehicle includes a drive train, one or more computing devices configured to control the drivetrain autonomously, and a set of user inputs configured to communicate with the one or more computing devices in order to initiate a request for the one or more computing devices to control the vehicle to the destination autonomously. The vehicle does not include a user-controlled steering mechanism, acceleration control, or deceleration control which would allow for a driving mode where a passenger would directly control at least one of steering, acceleration, or deceleration of the vehicle via the drive train.

BRIEF DESCRIPTION OF THE DRAWINGS

FIGS. 7A-7C are examples of an emergency stopping button of a vehicle in accordance with aspects of the disclosure.

DETAILED DESCRIPTION

Figure 1:
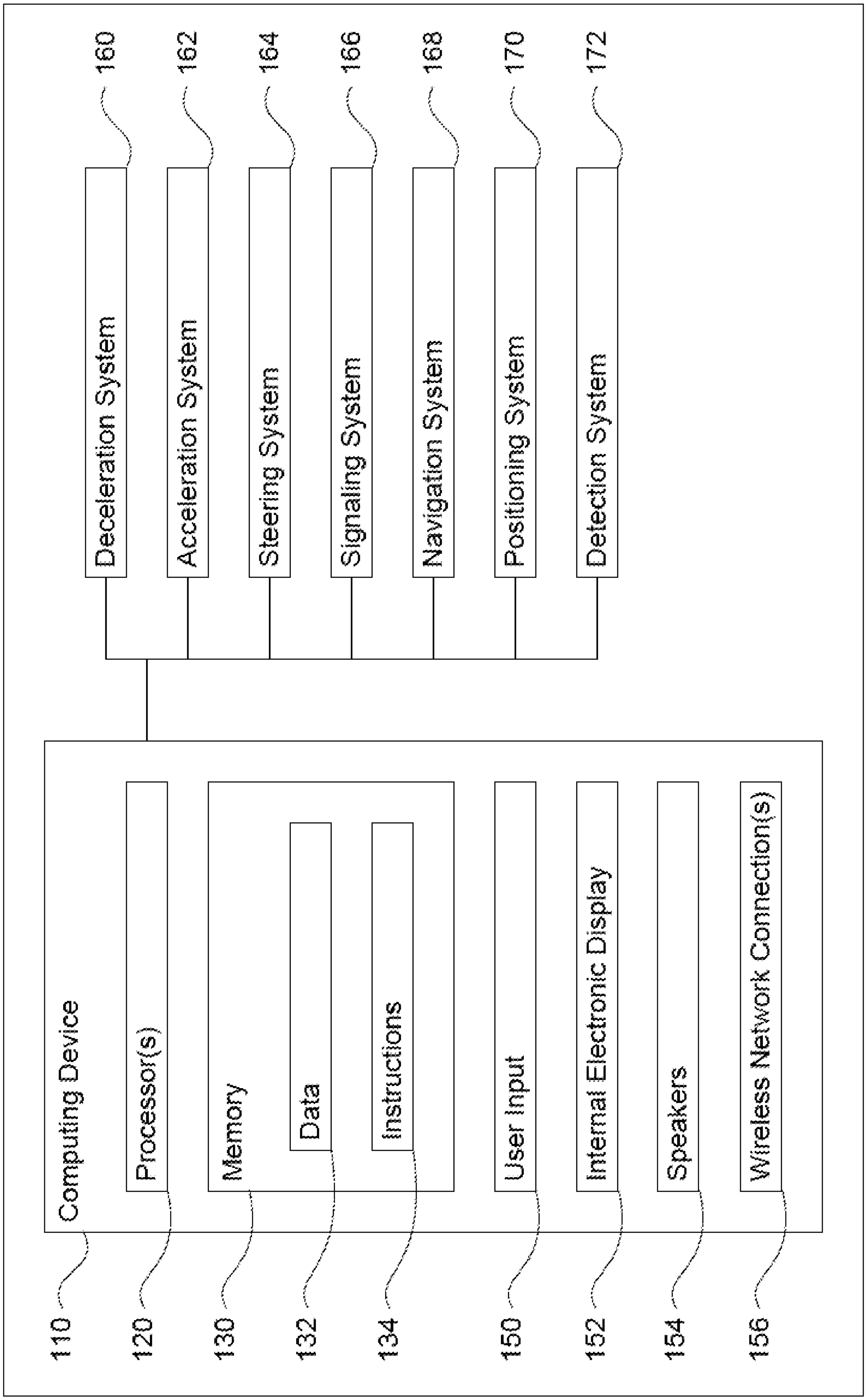
FIG. 1 is a functional diagram of an example vehicle in accordance with an exemplary embodiment.

The technology relates to a vehicle for maneuvering a passenger to a destination, for example taking a trip, autonomously. The vehicle may include various user inputs for initiating as well as terminating such trips. In one example, the vehicle may include various buttons that can be used to communicate requests from a passenger to the vehicle's computers in order to initiate a trip, pull the vehicle over, or initiate an emergency stop. These buttons may therefore obviate the need for typical vehicle inputs such as a steering wheel, brake or acceleration pedals, or such inputs that would provide the passenger with direct communication with the vehicle's drive train or direct control over the steering, acceleration, or braking of the vehicle.

In one example, the buttons may include a multipurpose button. The multipurpose button may have a plurality of different states with different states of activation. For instance, in a first state, where the vehicle is not ready to begin a trip, such as when a door is open or a seatbelt has not been buckled, the button may have no function or be inactive. Once the vehicle is ready to begin a trip, the button may switch to a second state. In this second state, the button may be used to communicate a request from a passenger to the vehicle's computer to begin a trip to a destination. Once a trip has begun, the button may switch to a third state. In this third state, the button may be used to communicate a request from a passenger to the vehicle's computer to pull the vehicle over. When the vehicle has stopped or pulled over, the button may revert to the first or second state depending upon the circumstances. In order to differentiate between the states, the buttons may display information to the user to indicate the current state of the button.

Alternatively, rather than having a single multipurpose button as described above, two buttons with different states of activation may be used. For example, both buttons may initially be inactive where the vehicle is not ready to begin a trip, such as when a door is open or a seatbelt has not been buckled. Once the vehicle is ready to begin a trip, only one of the buttons (the first button) may switch to an active state where the first button may be used to communicate a request from a passenger to the vehicle's computer to being a trip to a destination. The second button may remain inactive until the vehicle has begun a trip. At this point, the first button may become inactive again, and the second button may be switched to an active state where the second button may be used to communicate a request from a passenger to the vehicle's computer to pull the vehicle over. In this regard, only one of the buttons is available to be used by the passenger at a time. When the vehicle has stopped or pulled over, the second button may change to the inactive state, while the first button may change to the active or inactive state depending upon the circumstances. Again, in order to differentiate between the states, the buttons may display information to the user to indicate the current state of the button.

In response to a request to pull the vehicle over via any of the buttons described above, the vehicle's computer may provide the passenger with an opportunity to cancel the request. For example, by pressing the button a second time within a short period of time or until the vehicle begins to physically pull over, the request may be cancelled. Although not required, to notify the passenger of the time to do so, a countdown may be used. Once the countdown has reached zero, the vehicle's computer may begin to look for a reasonable place to stop and/or pull the vehicle over.

In order to pull the vehicle over safely, the vehicle's computer may look for an open space to pull the vehicle over. If one is not available within a short period of time, such as ten seconds or more or less, or distance, the vehicle's computer may bring the vehicle to a stop in the current lane or as far to the right as possible, changing lanes if necessary, so long as the vehicle is not in an unsafe location. Examples of unsafe locations may include train tracks, intersections, busy roadways, etc. which may be identified, for example, based on a combination of sensor data and pre-stored map information. If the vehicle is in an unsafe location, the vehicle's computer may continue to look for an open space to pull over outside of the short period of time. If necessary, the vehicle may simply stop in the middle of a lane.

The buttons may also include an emergency stop button for communicating a request from a passenger to the vehicle's computer to initiate an emergency stop. If such a stop is initiated, the vehicle's computer may stop the vehicle within a very short period, such as 3 seconds or more or less depending, for example, on the speed and braking power of the vehicle or the speed and distance of another object (such as another vehicle) behind the vehicle. The vehicle's computer may also display a notification to the passenger indicating that the emergency stop button has been activated and help has been called (either a concierge or an emergency response center, e.g., a 911 call center). When the emergency stop button is used, the vehicle's computer may prevent the passenger from beginning a new trip without the assistance of the concierge or at all. Accordingly, the vehicle's computer may change the states of the other buttons to inactive state.

Given the nature of the emergency stop described above, the emergency stop button may be configured to reduce the likelihood of accidental use of the button. For example, rather than a simple push-button activation, the emergency stop button may require that the passenger pull up on the emergency stop button. In order to differentiate between the buttons, the emergency stop button may be in a different color from other buttons, such as red, and may include a warning-type text such as "STOP NOW—EMERGENCY" in order to indicate to the passenger the purpose of the emergency stop button. In addition, the emergency stopping button may be positioned in order to allow more than one passenger to activate this button when needed. In this regard, more than one emergency stopping button may be used in a vehicle, such as where there is seating for three or more passengers, in order to allow all passengers the ability to use the emergency stopping buttons.

The emergency stop button may also include a cover which must first be removed, lifted, or otherwise displaced before the passenger is able to activate the emergency stop button. In one example, the cover may be a flip up cover. The flip up cover may be a spring-loaded cover with a damper that slows down the closure of the flip-up cover. As another example, the cover may be slid away from over the emergency button. The cover may also be made of clear plastic in order to allow the passenger to see the emergency stop button and to read the text of the button. The combination of the flip up cover and the pull up button are simple and easy to use, but also reduce the likelihood of accidental activation of the emergency stop button.

In addition to the buttons described above, the vehicle may also include other means for providing user input such as a microphone or camera (for communicating with a concierge) and/or one or more wireless network connections. In one example, the wireless network connections may include short range wireless network connections for communicating information between a client computing device of the passenger and the vehicle's computer. In addition, the wireless network connections may allow for communications between the vehicle's computer and a server computing device. In this regard, the server computing device may relay information received from the passenger's client computing device to the vehicle's computer.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computer 110 may use the positioning system 170 to determine the vehicle's location and detection system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

Figure 2:
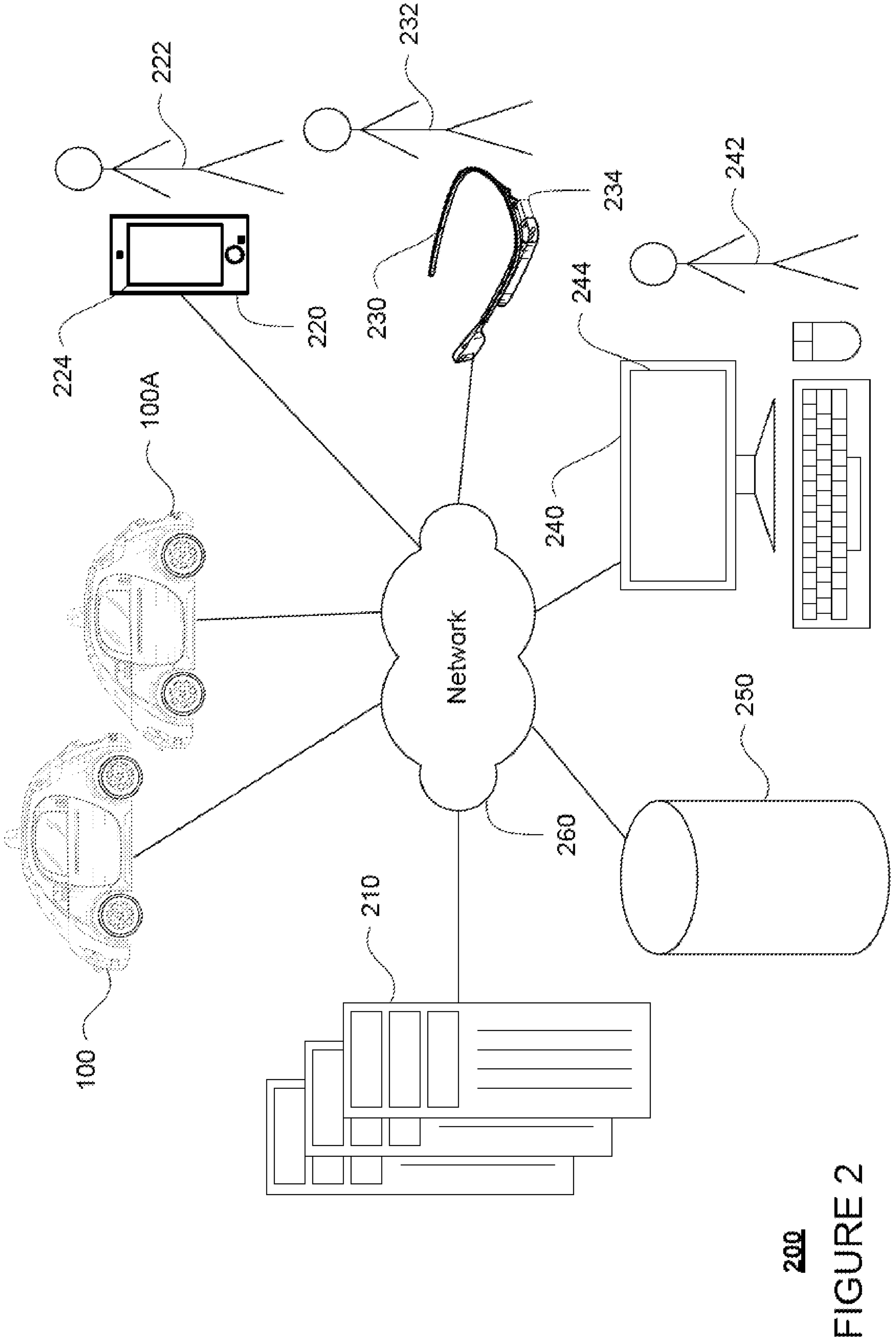
FIG. 2 is a functional diagram of an example system in accordance with an exemplary embodiment.
Figure 3:
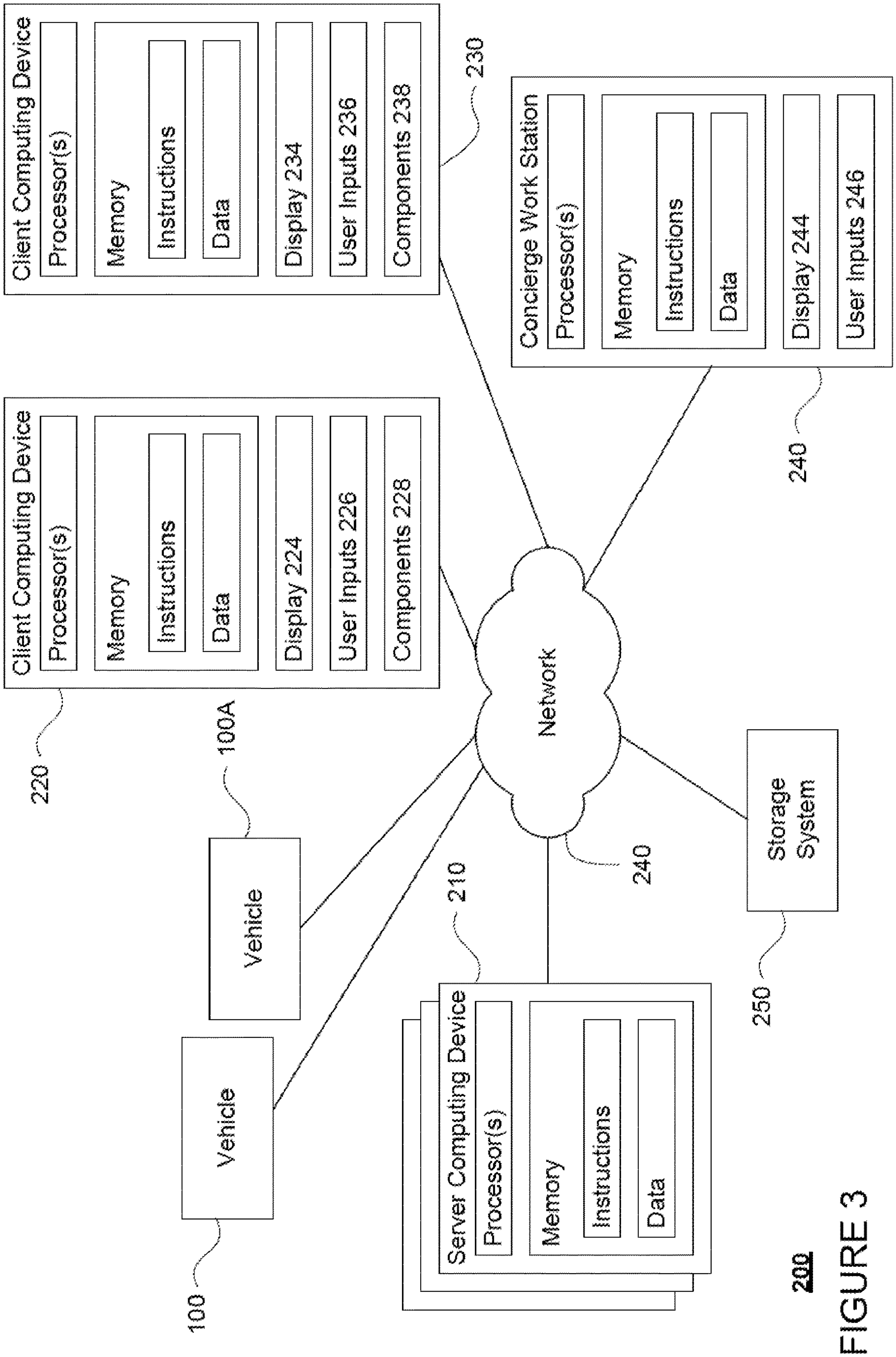
FIG. 3 is a pictorial diagram of the system of FIG. 2 in accordance with aspects of the disclosure.
Figure 4A:
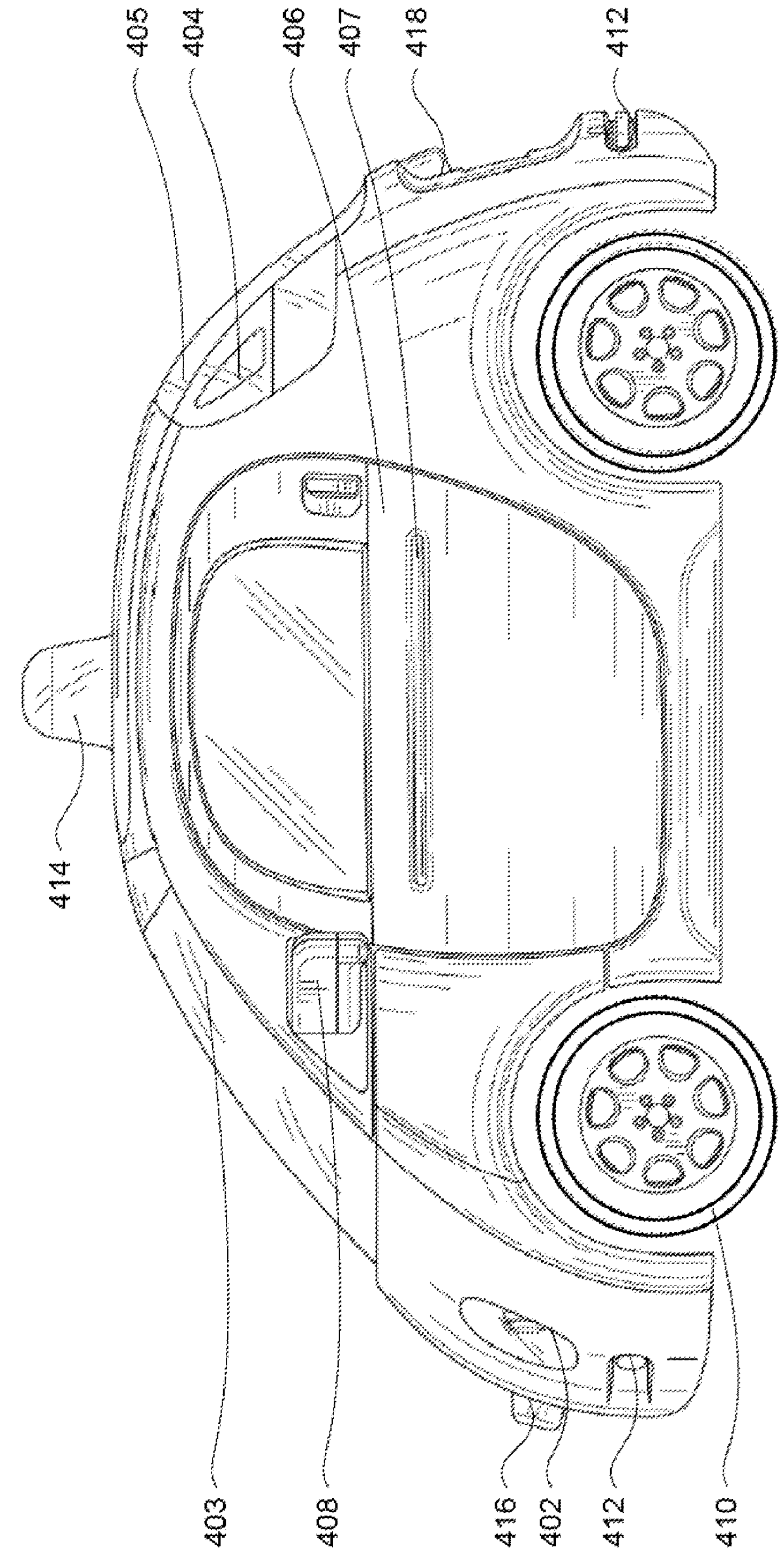
FIGS. 4A-4D are example external views of a vehicle in accordance with aspects of the disclosure.
Figure 4C:
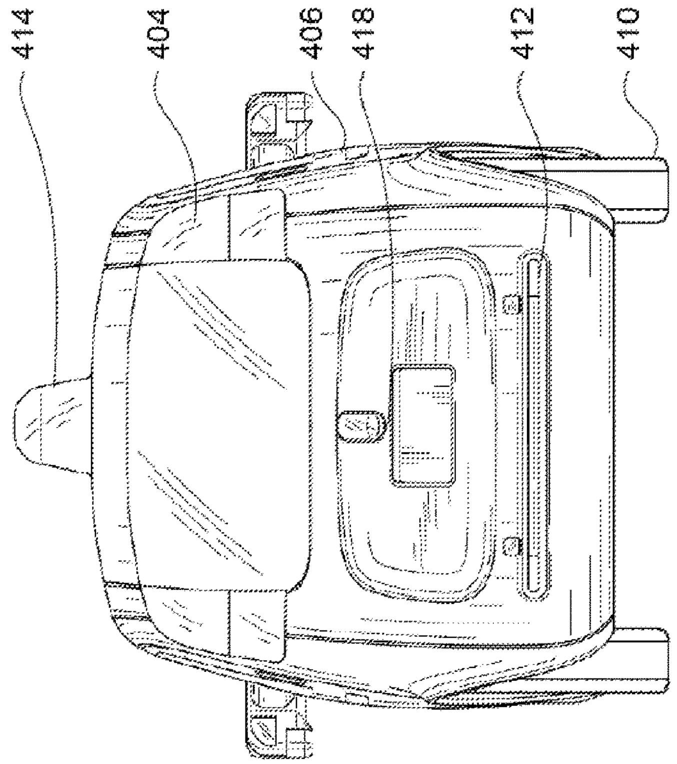
Figure 4B:
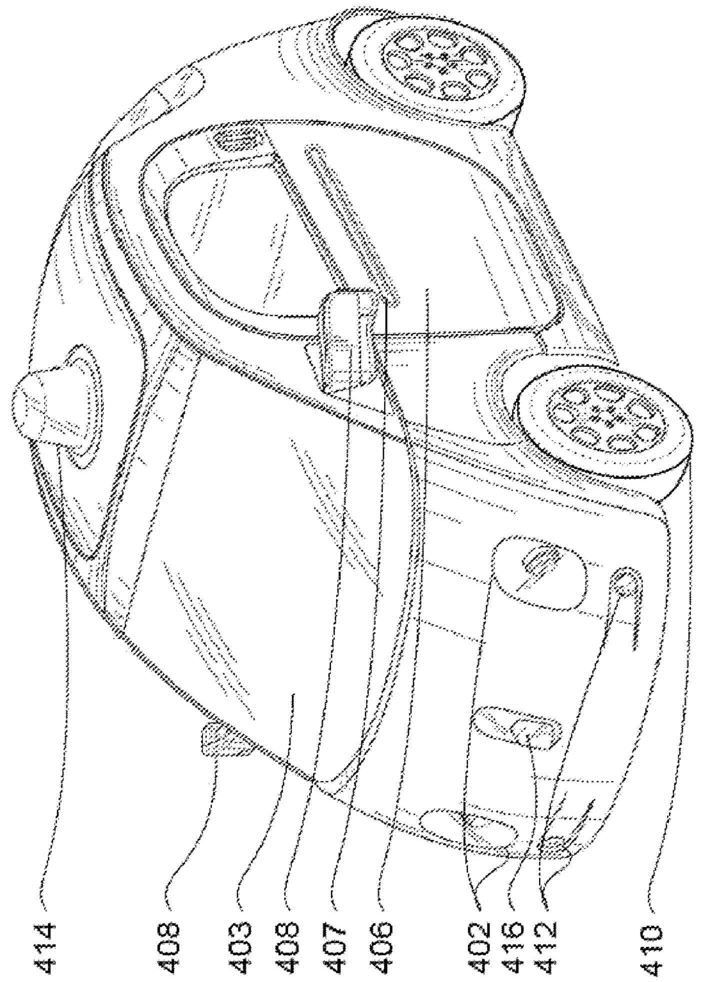
Figure 4D:
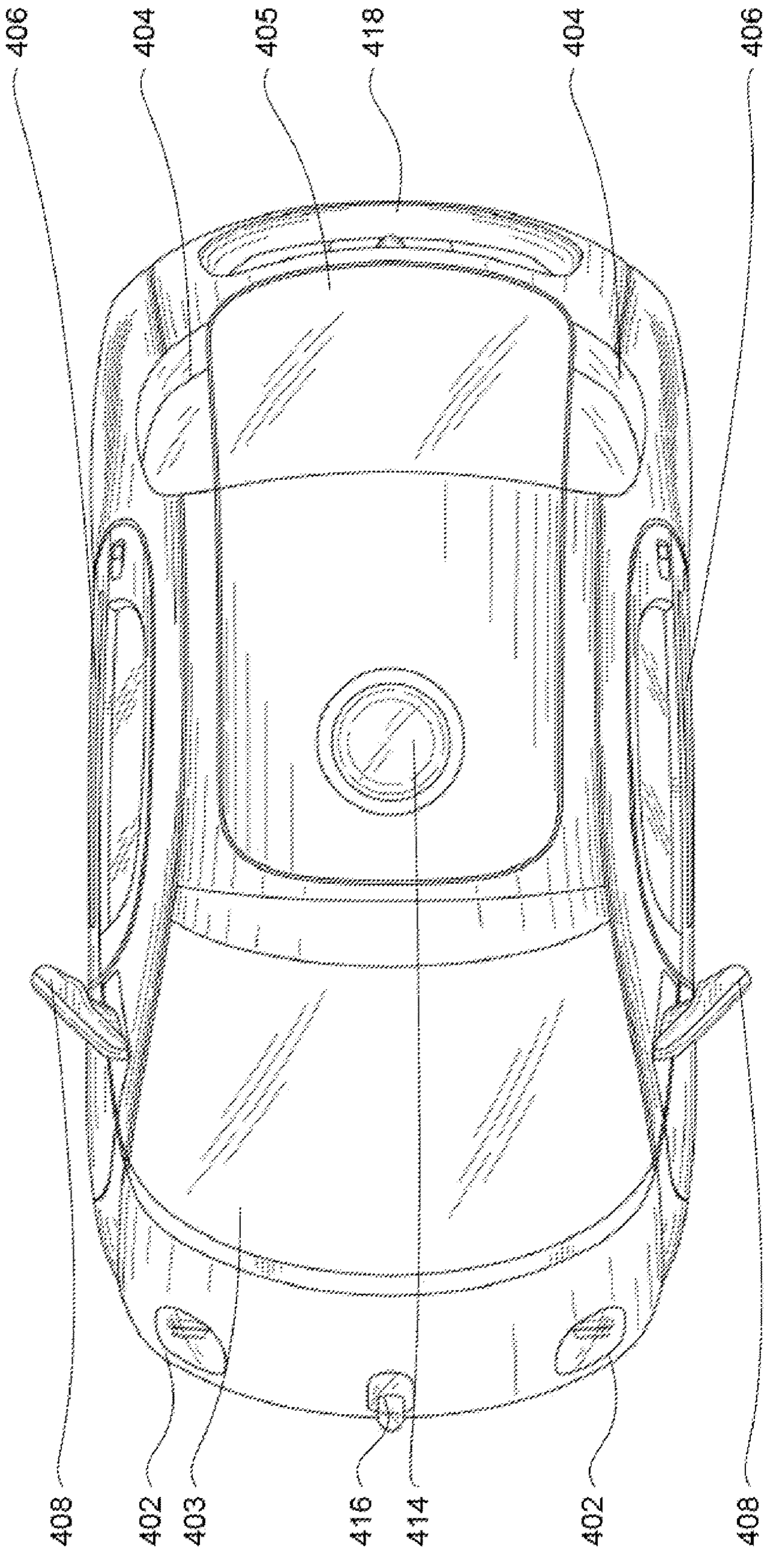

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch-screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Figure 5:
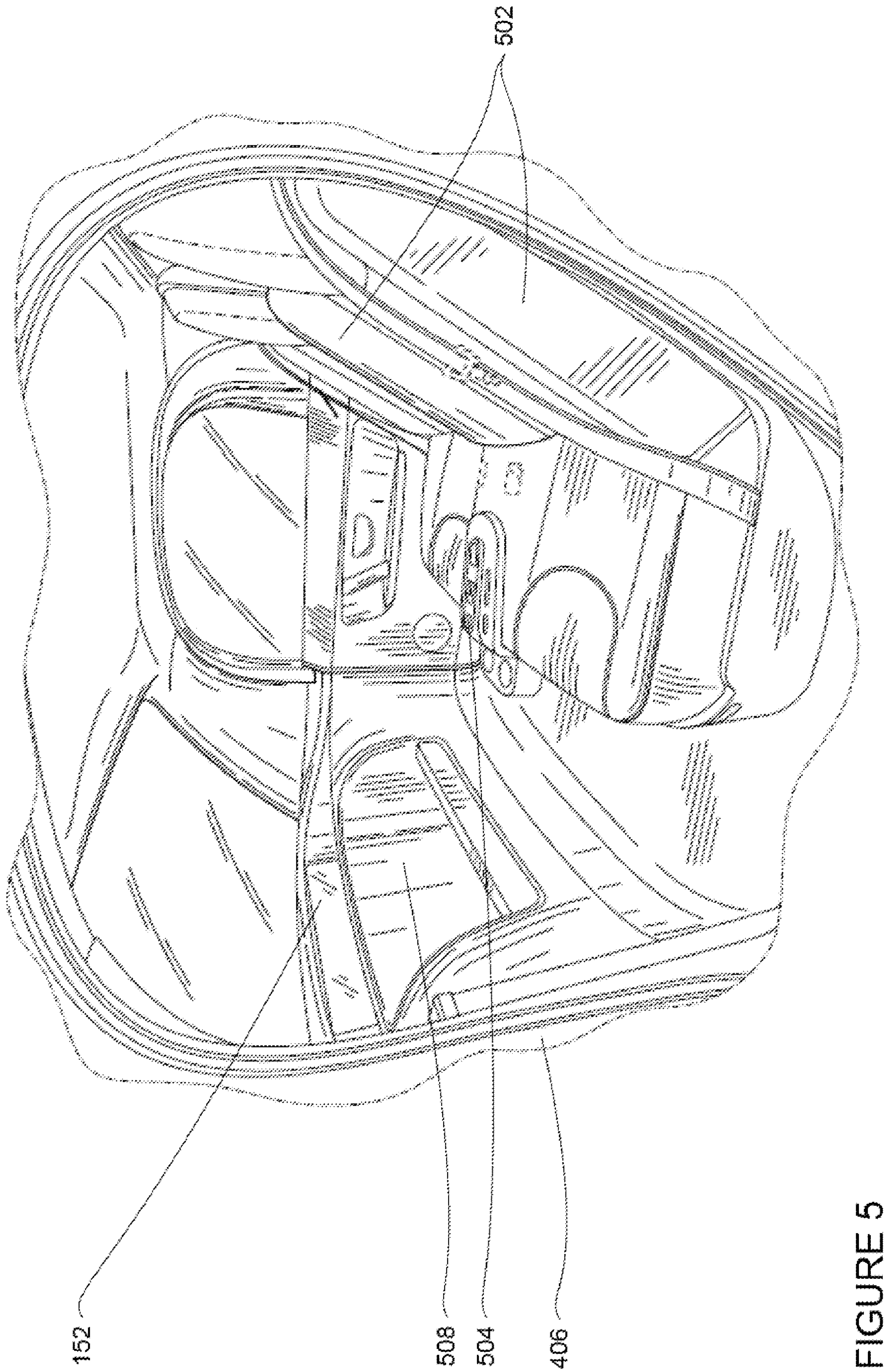
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

The internal electronic display 152 has a generally rectangular shape where the width of the display is significantly smaller than the length. The internal electronic display 152 may include an anti-reflective coating and be situated above the storage bin area 508 in order to align with a passenger's eye level when seated in either of the seats 502. The microphone of the user input 150 may be a located behind a small opening at the top center of the internal electronic display 152.

Storage bin area 508 may be configured to hold items such as shopping bags, purses, backpacks, etc. The depth of the storage bin may be configured such that larger objects are less likely to tip out of the storage bin area during an abrupt deceleration or acceleration of vehicle 100. In some examples, elastic straps may be used to further secure items in the storage bin area. Storage bin area 508 may serve a dual purpose as a foot rest for passengers seated in seats 502.

Figure 6:
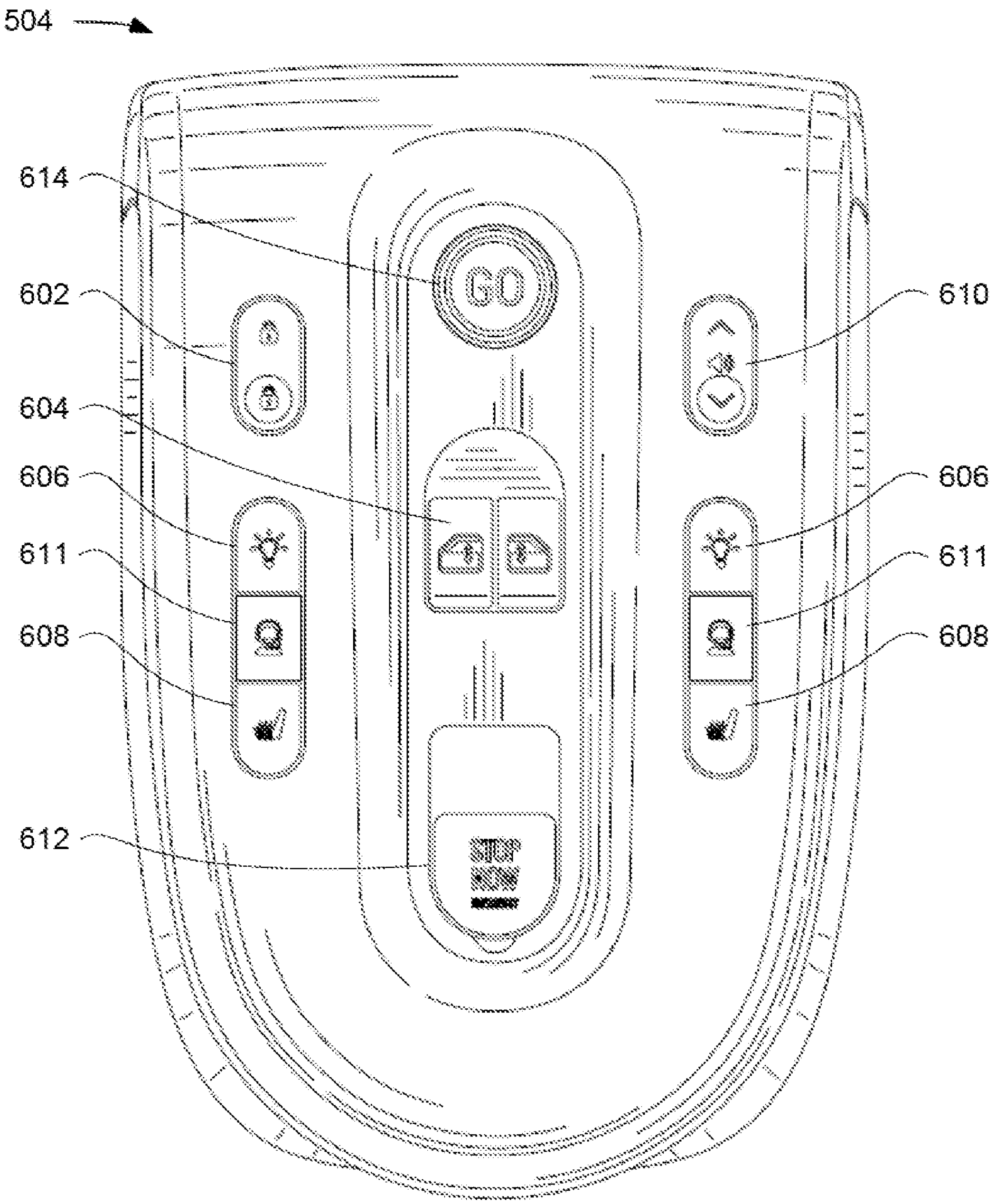
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computer 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency.

In addition, because of the potentially abrupt nature of a stop initiated by the emergency stopping button 612, the emergency stopping button may include one or more features that may reduce the likelihood of accidental activation of the emergency stop button. As an example, such features may include a cover which must first be removed, lifted, or otherwise displaced before the passenger is able to activate the emergency stop button, and the emergency stopping button may need to be pulled (rather than pushed) in order to be activated.

FIGS. 7A-7C are examples of emergency stopping button 612 with a flip up cover 712. The flip up cover 712 may be a spring-loaded cover with a damper that slows down the closure of the flip-up cover. FIG. 7A is an example of the flip up cover 712 and emergency stopping button 612 in the typical down position. In this regard, the emergency stopping button is not activated and the flip up cover is closed. In this example, the cover may be made of clear plastic in order to allow the passenger to see the emergency stop button and to read the text of the emergency stopping button.

In FIG. 7B, the flip up cover 712 has been opened, but as can be seen, the emergency stopping button has not been activated. In this regard, even though the cover has been removed, a second action on the emergency stopping button must be performed in order to initiate an emergency stop.

In FIG. 7C, the flip up cover 712 has been opened and the emergency stopping button 612 has been activated (as it is shown in the up position). As shown, the emergency stopping button 612 must be pulled up in a direction generally opposite of the flip up cover in order to activate the emergency stopping button. The combination of the flip up cover and the pull up button are simple and easy to use, but also reduce the likelihood of accidental activation of the emergency stop button.

Other features and configurations may also be used for the emergency stopping button. For example, Rather than flipping up, the cover may be slid away from over the emergency button. Similarly, rather than being pulled up, the emergency stopping button may have a typical push button activation.

Figure 8:
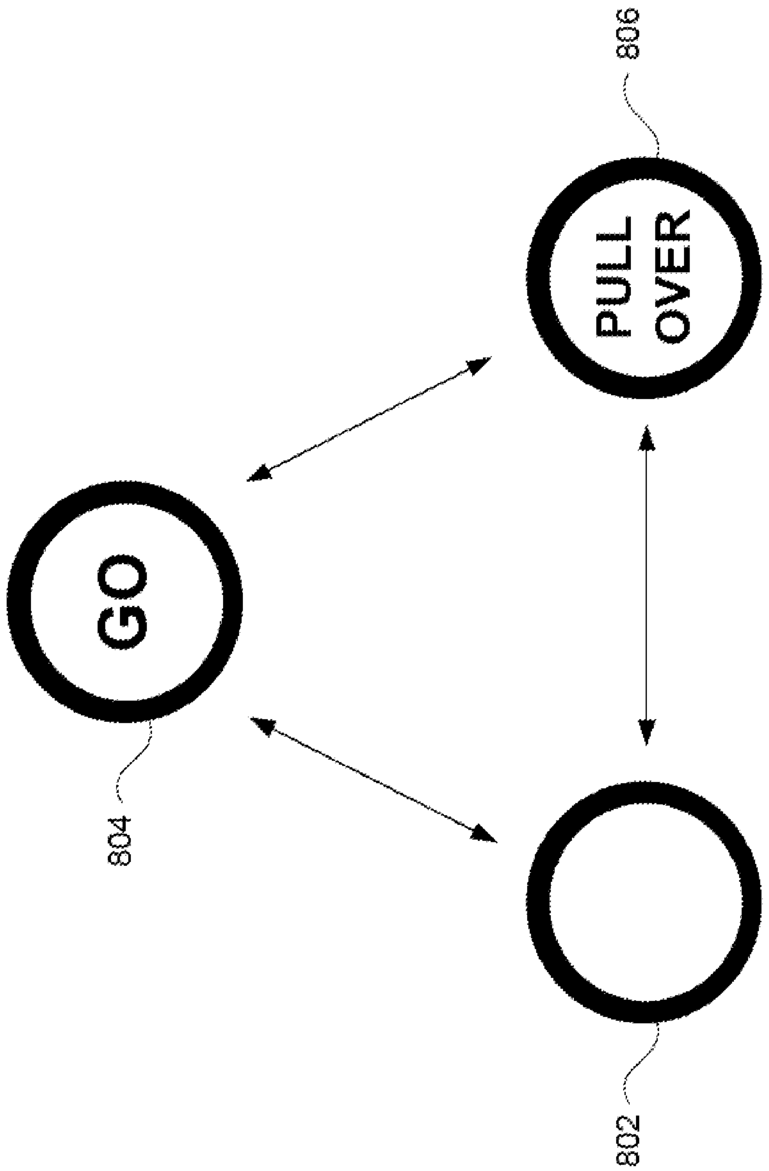
FIG. 8 is an example of three different states of a button of a vehicle in accordance with aspects of the disclosure.

Button 614 may be a multi-function button. For example, FIG. 8 provides examples of the same button; here button 614, in three different states. In the first state 802, button 614 is inactive, that is, if pressed, the vehicle's computer 110 would not respond by taking any particular action with regard to controlling the movement of the vehicle. However, even in this inactive state, the vehicle's computers may provide a passenger with some visual or audible feedback to indicate that the button is pressed. As an example, this feedback may indicate that the computer recognizes that the button was pressed or otherwise activated, but that button is currently inactive and the vehicle will not respond by maneuvering the vehicle in any particular way (e.g., not starting a trip or pulling over).

In the second state 804, when the vehicle is ready to begin a trip, the button 614 may change to a "GO" button which a passenger uses to initiate a trip to a destination or drop off location. Once vehicle 100 is moving, button 614 may change to a third state 806, where the button 614 is a "PULL OVER" button which a passenger users to initiate a non-emergency stop. In this regard, computer 110 may respond by determining a reasonable place to pull the vehicle over, rather than coming to a more sudden stop as with the emergency stop button 612. Arrows 812, 814, and 816 indicate that the states need not be displayed only in the order of first, second third, but may switch from second to first, third to first, third to second, etc. as dictated by the needs of computer 110.

Alternatively, rather than having a single multipurpose button 614, two buttons with different states of activation may be used. In this regard, a first button may have an inactive state and an active or "GO" state which enables a passenger to initiate a trip to a destination or drop off location. A second button may have an inactive state and an active or "PULL OVER" state which enables a passenger to initiate a non-emergency stop. In some examples, when the first button is in the active state, the second button is in the inactive state. Similarly, when the second button is in the active state, the first button may be in the inactive state. As discussed in further detail below, before the vehicle is ready to start a trip to a drop off location, both the first and second buttons may be in the inactive state.

Thus, passenger communication with computer 110 for navigation purposes may be limited to button 614 (or two buttons as in the example above), emergency stopping button 612, wireless network connection 156 (such as Bluetooth LE) with the passenger's client computing device, and by sending information from the passenger's client computing device to the server 210 which then relays that information to the vehicle's computer. In some examples, a passenger may provide information to the vehicle's computer 110 via voice commands though the microphone as discussed above. In addition, however, the passenger may communicate with the concierge via a phone call, an application on the passenger's client computing device, a microphone, and/or the concierge button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle. As an example, a user such as user 232 may use client computing device 230 to send a request to one or more server computing devices 210 for a vehicle. In this regard, the request may identify the user 232 and may also provide information such as a pickup location for the user (such as one inputted by the user or a current location of the user's client computing device obtained, for example, using components 238), as well as a destination location. This destination location may be input by the user.

The client computing device, via the application, may send the request to one or more server computing devices 210. In response, the server computing devices may dispatch a vehicle to the current location of the user and provide other information such as an estimated pickup time. Alternatively, the server may notify the client computing device if there are no vehicles available.

Using his or her client computing device, the user may input, provide, or otherwise select a pickup location, a drop off location, and, in some cases, one or more intermediate stopping locations anywhere within a service area where a vehicle can stop. This information may then be sent to the server computing devices 210 and relayed to the dispatched vehicle, such as vehicle 100. These pickup and destination locations may be predefined (e.g., specific areas of a parking lot, etc.) or may simply be any location within a service area of the vehicles.

When a vehicle arrives for a user, the computer 110 may attempt to authenticate the user. For example, using a wireless connection having a short range communication protocol such as Bluetooth LE, the computer 110 and the client computing device may communicate at some predetermined distance, such as 25 meters. Once the communication is established, for example, using one of the wireless network connections 156 the client computing device may be authenticated using any known authentication technique as an approximation or proxy for authenticating the user. In some cases, the authentication may occur even before the vehicle has reached the selected location if the vehicle passes by the user's client computing device and makes the wireless connection.

Once the user (and/or the user's client computing device) is authenticated to a sufficient degree and has reached a certain threshold distance from the vehicle 100, for example 10 meters or less, the doors 406 may automatically unlock, and in some cases open up, to allow the user to enter the vehicle.

Once the user (and/or the user's client computing device) has entered the vehicle, the computer 110 may display a welcome screen on the internal electronic display 152. This welcome screen may provide instructions to the user (now a passenger) on how to use the vehicle. For example, the instructions may include requesting that the passenger shut the doors 406 if needed and buckle his or her seatbelt. Sensors associated with the seats, doors, and seatbelts may be used to determine if the passenger has complied. At this time, button 614 may be in the inactive state or the first state 802 of FIG. 8.

Once the passenger has complied with the instructions, the computer 110 may activate the button 614 or change button 614 to the second state 804. In this regard, if the user does not close the door or buckle the seat belt, the computer 110 may not allow the passenger to use the vehicle for a trip by preventing button 614 from changing out of the inactive or first state 802. As noted above, when the passenger is ready to initiate a trip to the destination, he or she may press or otherwise activate button 614. In response, the computer 110 may initiate the necessary systems to control the vehicle autonomously to the destination (drop off location).

Once the passenger has activated button 614, the computer 110 may also indicate on the internal electronic display 152 that the vehicle 100 is getting ready to move. In addition, a passenger specific or default soundscape may begin playing through the speakers 154 and the internal electronic display 152 may then provide a "ride screen" which provides information such as an estimated time of arrival, information about the destination, current time, weather, etc.

Once the passenger has activated the button 614 to initiate a trip to the destination and the computer 110 is controlling the vehicle autonomously, the computer 110 may change the state of button 614 to the third state 806 where button 614 becomes a "PULL OVER" button. If, during a ride, the passenger were to activate the button 614 when in the "PULL OVER" state, the computer 110 would respond by identifying a reasonable place to stop or pull the vehicle over before the destination is reached. The computer 110 may also provide a notification to the user that the vehicle is attempting to pull over on the internal electronic display 152. This pull over function may also be achieved by calling a concierge or by using the application on the passenger's client computing device.

Thus, the pull over button may allow the passenger to stop the vehicle mid-trip. In order to do so, it is important to balance the desire to respond quickly with the need to find a reasonable place to stop the vehicle. As an example, when a user presses the pull over button, the button may revert back to the second state 804 and become a "GO" button once again.

Once the button 614 has been activated in the third state 806, the computer 110 may also display some version of: "Preparing to pull over. To cancel, press the Go button" on the internal electronic display 152. In this regard, the passenger may cancel the request to pull the vehicle over by pressing or otherwise activating button 614 again before the vehicle has begun to physically pull over, for example by slowing down or changing lanes. In one example, the display may also show a counter that counts down for a predetermined period of time, for example, 3 seconds. In this regard, if user presses the "Go" button (button 614 when in the second state 804), the countdown will clear and the trip will continue. If user does nothing, the counter counts down to zero. When the counter reaches zero, the computer 110 may begin to pull the vehicle over, and the passenger may not be able to prevent the vehicle from pulling over. In one example, if vehicle is not in the right most lane, vehicle will lane change to the right most lane as soon as and as safely as possible.

The computer 110 will then pull over the vehicle to the side of the road within a short period, for example, within 10 seconds or more or less. In order to do so, the computer 110 may look for an open space, such as room on a shoulder to pull out of the vehicle's current lane based on where the vehicle will be in the next 10 seconds. If no preferred pull over location can be found, and the vehicle is not in an unsafe location (e.g., train tracks, intersections, busy roadway, intersection), the computer may use the signaling system to turn on the hazard lights and come to a stop in the vehicle's current lane (preferably on the edge of the lane) even if it is a busy road.

Again, the emergency stop button 612, can be used by the passenger to immediately initiate an emergency stop. As discussed above with regard to FIGS. 7A-7C, the passenger may be required to remove a cover, such as flip up cover 712, and then activate button 612, by pulling up or pressing on the button 612 as needed.

If such an emergency stop is initiated, the computer 110 may stop the vehicle within a very short period, such as 3 seconds or more or less depending, for example, on the speed and braking power of the vehicle. The computer may also display a notification to the passenger indication that the emergency stop button has been activated and help has been called (either a concierge or an emergency response center, e.g., a 911 call center). In addition, a concierge may be automatically connected to the vehicle in order to assess the status of the passenger and vehicle, for example by using a video or still camera to view the passenger and check on his or her safety.

Once the vehicle is stopped, if the doors were previously locked during the trip, the doors may then unlock and, if not previously locked, simply open and allow the user to exit the vehicle. As part of this process, the vehicle may de-authenticate.

Figure 9A:
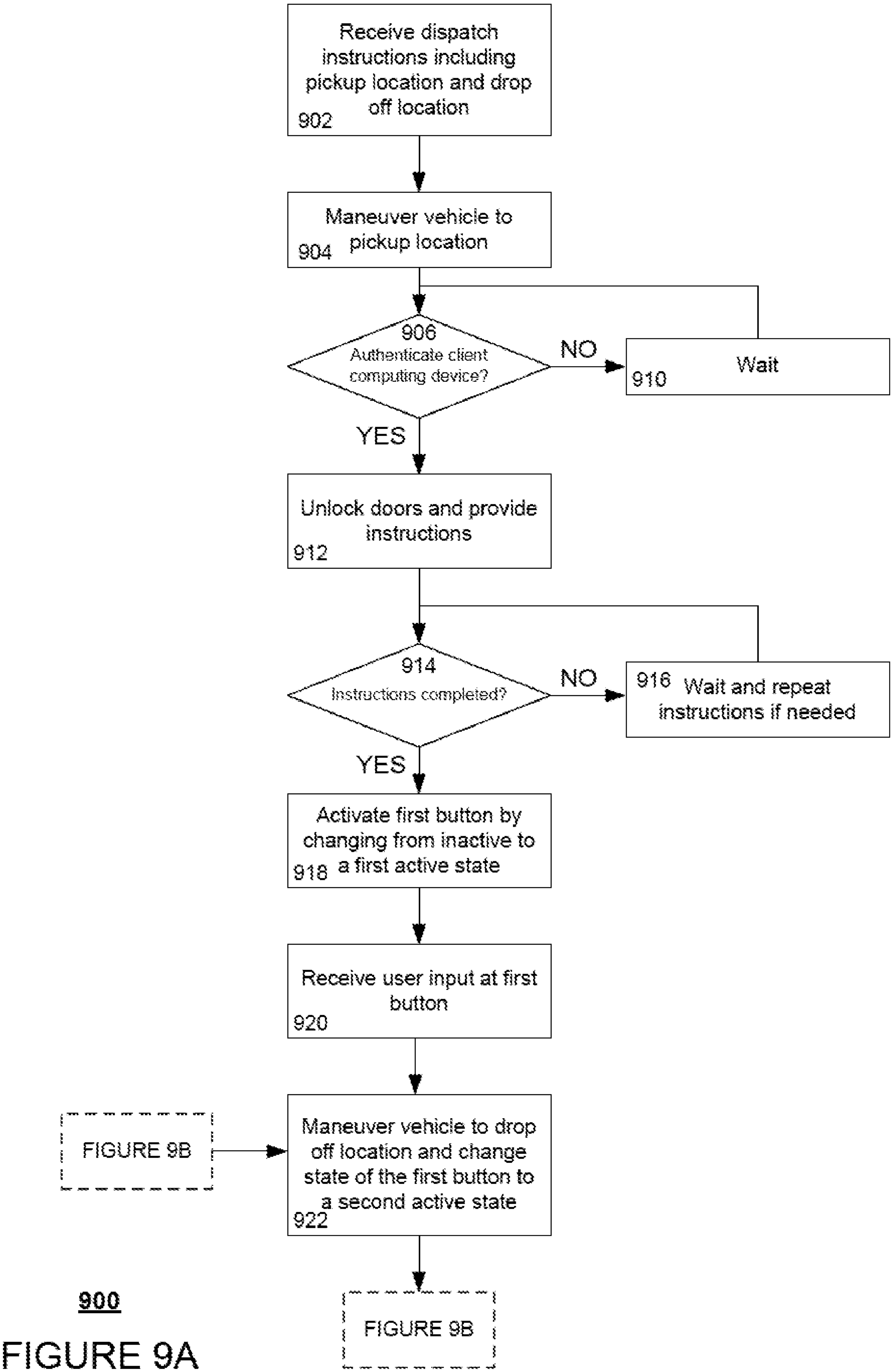
FIGS. 9A and 9B are an example flow diagram in accordance with aspects of the disclosure.
Figure 9B:
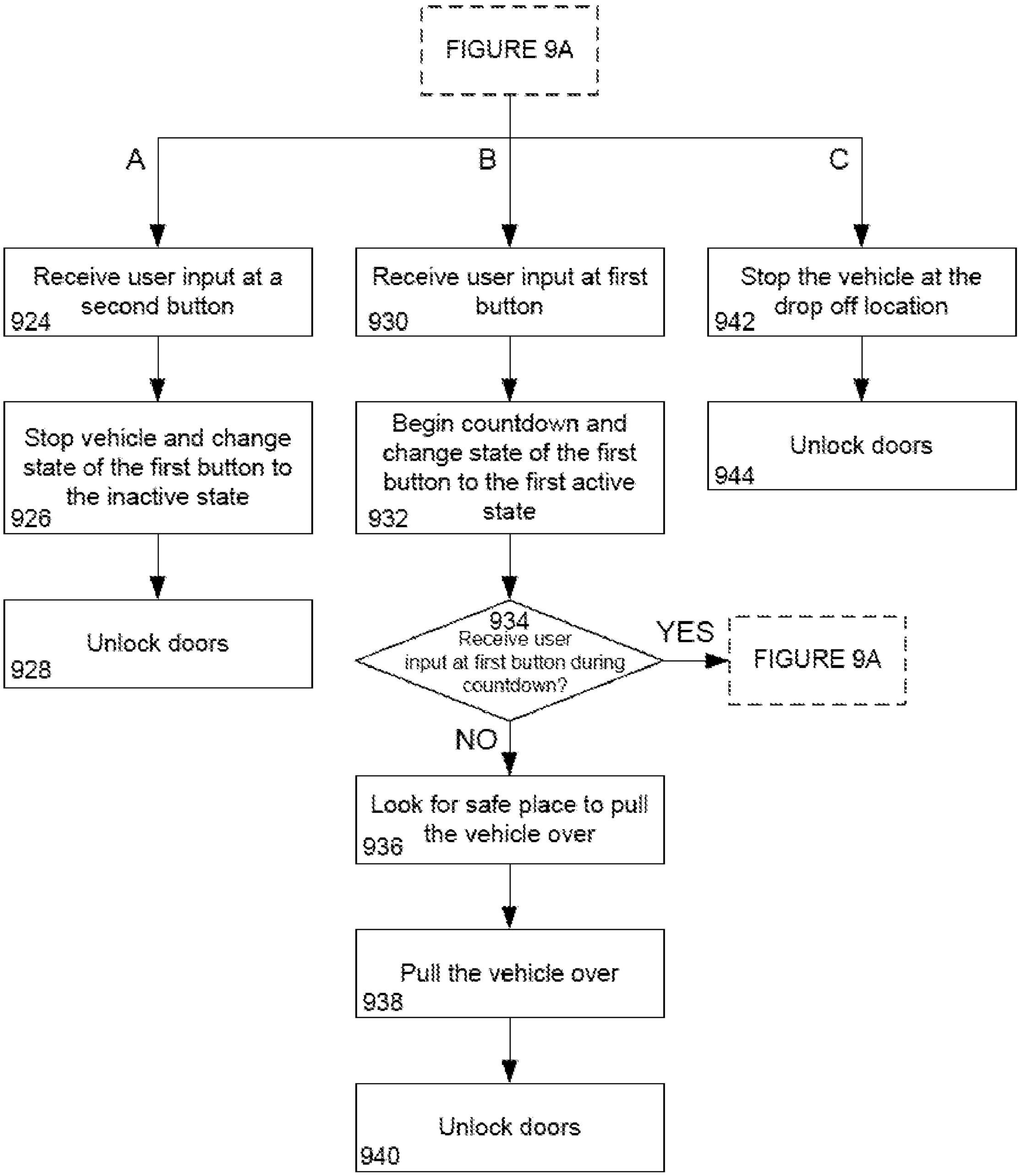

FIGS. 9A and 9B are an example flow diagram 900 of some of the aspects described above that may be performed by one or more computing devices of an autonomous vehicle, such as computer 110 of vehicle 100. In this example, the computer 110 receives dispatch instructions including a pickup location and a drop off location at block 902. The vehicle's computer then maneuver's the vehicle to the pickup location at block 904. Once the vehicle has arrived, the computer 110 authenticates a client computing device of a passenger as described above at block 906. At block 910, if the client computing device is not authenticated, the computer waits at block 910 until the authentication is successful or until further instructions are received, for example, from the server computing device 210 or concierge work station 240. When the authentication is successful, the computer 110 may unlock the doors of the vehicle and provide instructions to the passenger at block 912. As noted above, these instructions may include asking the passenger to close the door and fasten his or her seat belt.

The computer then determines whether the instructions have been completed at block 914. If not, the computer may wait and repeat the instructions as needed at block 916. The computer may even wait for instructions, for example, from the server computing device 210 or concierge work station 240. Once the instructions are completed, the computer 110 activates a first button by changing the first button from an inactive to a first active state at block 918. This button may correspond to button 614. In this regard, the inactive state may correspond to the first state 802 and the first active state may correspond to the second state 804 as discussed above.

The computer 110 receives user input at the first button at block 920. In response, the computer 110 maneuvers the vehicle 101 to the drop off location and changes the state of the first button to a second active state at block 922. In this example, the second active state may correspond to the third state 804 of button 614.

Continuing to FIG. 9B, the flow diagram then breaks into three separate branches; A, B, and C. In branch A, the computer 110 receives user input at a second button at block 924. This second button may correspond to the emergency stopping button 612. In this regard, the computer immediately stops the vehicle and changes the state to the first button to the inactive state at block 926. Again, in this example, the computer 110 may change the state of button 612 to the inactive or first state 802. Once stopped, the computer 110 unlocks the doors at block 928.

In branch B, the computer 110 receives user input at the first button at block 924. Again, the first button is in the second active state corresponding to the third state 806. In this regard, the computer begins a countdown and changes the state of the first button to the first active state at block 932. This gives the passenger the opportunity to cancel the request to pull the vehicle over. The computer 110 then waits to see if it receives user input at the first button during the countdown at block 934. If so, the flow diagram returns to block 922 of FIG. 9B, where the computer 110 maneuvers the vehicle to the drop off location and changes the state of the first button back to the second active state. Returning to block 934 of FIG. 9B, if the computer does not receive user input at the first button during the countdown, the computer looks for a safe place to pull the vehicle over as described above at block 936. The computer 110 eventually pulls the vehicle over at block 938, and once stopped, the computer 110 unlocks the doors at block 940.

In branch C, the computer 110 receives no user input at the first button or the second button while maneuvering the vehicle to the drop off location. As such, once the vehicle reaches the drop off location, the computer may stop the vehicle at block 942 and at block and once stopped, the computer 110 unlocks the doors at block 944.

As noted above, in some examples, the passenger may also provide one or more intermediate stopping locations. In such an example, once the vehicle has reached an intermediate stopping location, the computer 110 may again stop the vehicle and unlock the doors (as shown in blocks 942 and 944). At this time, the computer 110 may also change the state of the first button from the second active to the first active state until the passenger has either opened the doors or taken off his or her seatbelt. As such, the flow may return to block 912 of FIG. 9A to ask the passenger to close the door and fasten the seatbelt if necessary and proceed to blocks 914 and/or 916 as applicable.

Again, as discussed above, rather than having a single multipurpose button such as button 614, two buttons with different states of activation may be used along with the emergency stopping button to communicate requests to the vehicle's computer. In order to differentiate between the states, the buttons may display information to the user to indicate the current state of the button as shown in FIG. 8. In this regard, both buttons may initially be in an inactive state (see state 802 of FIG. 8) where the vehicle is not ready to begin a trip, such as when a door is open or a seatbelt has not been buckled. Once the vehicle is ready to begin a trip, only one of the buttons (the first button) may be changed by the vehicle's computer to an active or "GO" state (see state 804 of FIG. 8) where the first button may be used to communicate a request from a passenger to the vehicle's computer to being a trip to a destination. The second button may remain in the inactive state until the vehicle has begun a trip.

Once a trip has been initiated by activating the first button, the first button may become inactive again, and the second button may be changed by the vehicle's computer to an active state (see state 806 of FIG. 8) where the second button may be used to communicate a request from a passenger to the vehicle's computer to pull the vehicle over. In this regard, only one of these two buttons may be available to be used by the passenger at a time. When the vehicle has stopped or pulled over, the second button may be changed by the vehicle's computer to the inactive state again, while the first button may be changed by the vehicle's computer to the active or inactive state depending upon the circumstances of the stop.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising one or more processors configured to:
  - receive a pickup location and a destination;
  - prior to a vehicle reaching the pickup location, attempt authentication of a user;
  - responsive to successful authentication of the user, allow the user to board the vehicle at the pickup location;
  - subsequent to the user boarding the vehicle and initiation of travel to the destination, cause a user input in an active state to be visually indicative of the active state via presentation of at least one of a word or a color, wherein an input from the user at the user input in the active state initiates a request for the vehicle to pull over during travel to the destination;
  - receive, at the user input, the input from the user; and
  - in response to receipt of the input at the user input in the active state, cause the vehicle to pull over and stop.

2. The system of claim 1, wherein the one or more processors are further configured to, responsive to the successful authentication of the user, receive another input from the user to initiate travel of the vehicle to the destination.

3. The system of claim 1, wherein the one or more processors are further configured to attempt the authentication of the user when the vehicle is within a predetermined distance of the pickup location.

4. The system of claim 1, wherein the one or more processors are further configured to attempt the authentication of the user via a short-range communication protocol.

5. The system of claim 1, wherein the one or more processors are further configured to cause a door of the vehicle to unlock or open in response to the successful authentication of the user.

6. The system of claim 1, wherein the one or more processors are further configured to, in response to the input, provide a notification to the user indicating that the vehicle is attempting pulling over.

7. The system of claim 1, further comprising the vehicle.

8. The system of claim 7, wherein the vehicle does not have at least one of:
  - a user-controlled steering mechanism which would allow the user to directly control steering of the vehicle;
  - a user-controlled acceleration control which would allow the user to directly control acceleration of the vehicle; and
  - a user-controlled deceleration control which would allow the user to directly control deceleration of the vehicle.

9. The system of claim 1, wherein the one or more processors are further configured to identify a location at which to stop the vehicle in response to the input.

10. The system of claim 1, wherein the one or more processors are further configured to, in response to the input, cause the vehicle to identify an unsafe location at which to avoid stopping the vehicle.

11. The system of claim 10, wherein the unsafe location is within an intersection, on train tracks, or within a predetermined distance of the train tracks.

12. The system of claim 1, wherein the one or more processors are further configured to, in response to the input, cause the vehicle to stop in a lane of a roadway and activate hazard lights of the vehicle.

13. The system of claim 1, wherein the user input is an emergency stopping button.

14. The system of claim 1, wherein the user input is a non-emergency stopping button.

15. The system of claim 1, wherein the user input is an emergency stopping button or a non-emergency stopping button, and
  - wherein the one or more processors are further configured to, in response to the input, determine a period of time within which to stop the vehicle based on whether the input was received at the emergency stopping button or the non-emergency stopping button.

16. The system of claim 1, wherein the one or more processors are further configured to indicate the user input being in the active state in response to a seatbelt being buckled.

17. The system of claim 1, wherein the one or more processors are further configured to, responsive to arrival of the vehicle at the destination, deactivate the user input.

18. The system of claim 1, wherein the one or more processors are further configured to, in response to the input, cause the vehicle to pullover at a location other than the destination.

* * * * *